United States Patent
Onose et al.

(10) Patent No.: US 11,281,180 B2
(45) Date of Patent: Mar. 22, 2022

(54) PROGRAMMABLE CONTROLLER

(71) Applicant: FANUC CORPORATION, Yamanashi (JP)

(72) Inventors: Nao Onose, Yamanashi (JP); Mitsuru Mochizuki, Yamanashi (JP)

(73) Assignee: FANUC CORPORATION, Yamanashi (JP)

(*) Notice: Subject to any disclaimer, the term of this patent is extended or adjusted under 35 U.S.C. 154(b) by 0 days.

(21) Appl. No.: 17/060,077

(22) Filed: Oct. 1, 2020

(65) Prior Publication Data
US 2021/0132565 A1    May 6, 2021

(30) Foreign Application Priority Data
Oct. 30, 2019   (JP) .............................. JP2019-197431

(51) Int. Cl.
G05B 19/05    (2006.01)
G05B 19/418   (2006.01)

(52) U.S. Cl.
CPC ......... G05B 19/056 (2013.01); G05B 19/054 (2013.01); G05B 19/058 (2013.01); G05B 19/4185 (2013.01)

(58) Field of Classification Search
CPC .............. G05B 19/056; G05B 19/4185; G05B 19/058; G05B 19/054; G05B 2219/163; Y02P 90/02
See application file for complete search history.

(56) References Cited

U.S. PATENT DOCUMENTS

2017/0003672 A1*   1/2017   Ishikawa ............ G05B 19/4061

FOREIGN PATENT DOCUMENTS

JP       S63317834 A    12/1988

* cited by examiner

Primary Examiner — Christopher E. Everett
(74) Attorney, Agent, or Firm — Hauptman Ham, LLP (57) ABSTRACT

A programmable controller allocates times obtained by dividing executable time in one operation cycle to a plurality of paths, executes sequence programs of the paths in the respective allocated times, and accumulates remaining time as extra time when execution of each of the sequence programs ends before the end of the allocation time. When it is determined that surplus time occurs on the basis of the accumulated extra time, the programmable controller determines whether each of the sequence programs is executed after being divided, and executes a remainder of a divided sequence program in the surplus time in accordance with a result of the determination.

2 Claims, 10 Drawing Sheets

| NUMBER OF PATHS | PATH NAME | | |
|---|---|---|---|
| | FIRST PATH | SECOND PATH | THIRD PATH |
| ONE PATH | 100% | | |
| TWO PATHS | 80% | 20% | |
| THREE PATHS | 50% | 30% | 20% |

| NUMBER OF PATHS | PATH NAME | | |
| --- | --- | --- | --- |
| | FIRST PATH | SECOND PATH | THIRD PATH |
| ONE PATH | 100% | | |
| TWO PATHS | 80% | 20% | |
| THREE PATHS | 50% | 30% | 20% |
| | 5 | 4 | 1 |

PROGRAMMABLE CONTROLLER

RELATED APPLICATIONS

The present application claims priority to Japanese Patent Application Number 2019-197431 filed Oct. 30, 2019, the disclosure of which is hereby incorporated by reference herein in its entirety.

BACKGROUND OF THE INVENTION

1. Field of the Invention

The present invention relates to a programmable controller.

2. Description of the Related Art

In a programmable controller (or programmable logic controller (PLC)) used in a computer numerical control (CNC) and the like, sequence programs relating to objects to be controlled such as a body portion of a machine that performs machining, a tool management mechanism unit that manages a tool used in the machining, and peripheral equipment units such as a loader are operated.

The programmable controller repeatedly performs sequence control for each operation cycle thereof. The programmable controller scans (executes) the sequence program for a predetermined executable time from a timing at which each operation cycle is started. In some programmable controllers, a plurality of program levels, for example, a first level and a second level are prepared (for example, Japanese Patent Application Laid-open No. S63-317834).

Figure 9:
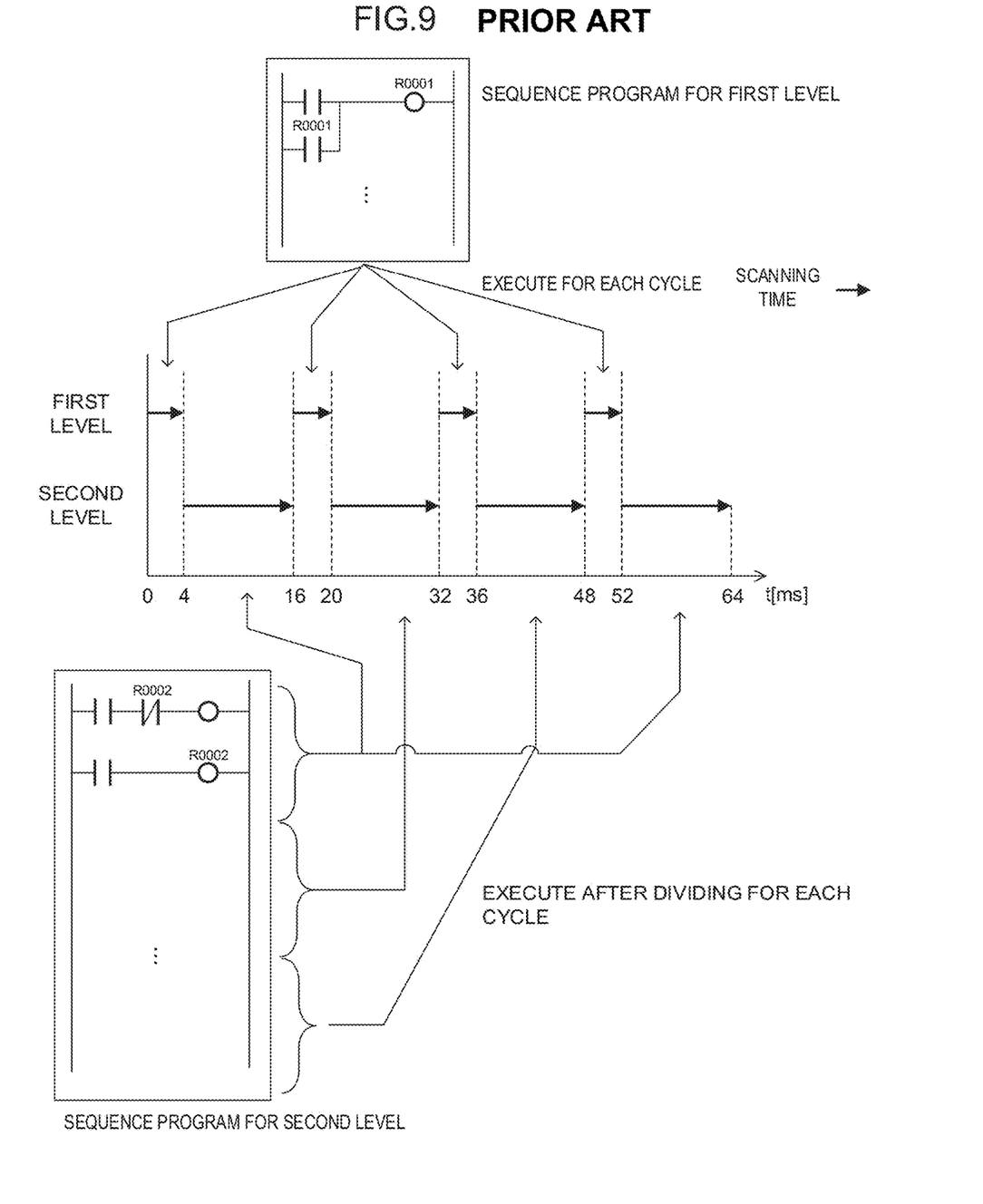
FIG. 9 illustrates an operation of a programmable controller according to the related-art technology.

As illustrated in FIG. 9, a programmable controller that prepares a plurality of program levels always scans (executes) a sequence program prepared for the first level at least once within an executable time. After the scanning (execution) of the sequence program of the first level ends within the executable time, the programmable controller divides a sequence program prepared for the second level by a scannable (executable) amount in the remaining time of the executable time, and scans (executes) the sequence program prepared for the second level in an interrupting manner.

In the example in FIG. 9, the executable time is 16 ms, the scanning in the first level ends at about 4 ms, and the scanning in the second level is performed for about 12 ms that is remaining. When the scanning time of the sequence program is sufficiently small with respect to one executable time, the programmable controller may perform the scanning of the sequence program a plurality of times. For example, when the executable time is 16 ms and the scanning time necessary for the scanning of the sequence program is 8 ms, the scanning of the sequence program is performed twice within the executable time.

Figure 10:
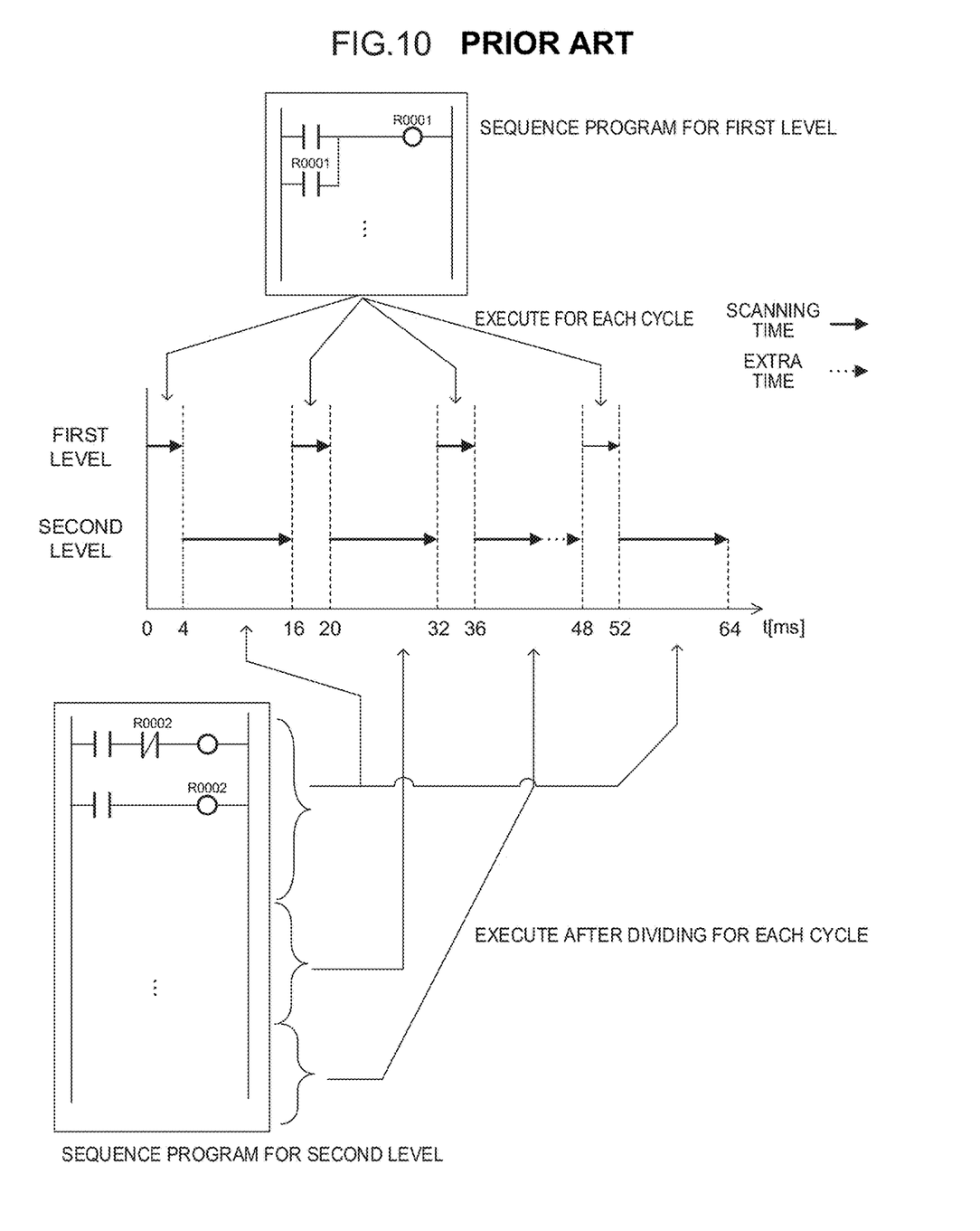
FIG. 10 illustrates a problem of the programmable controller according to the related-art technology.

Incidentally, the time necessary for the scanning of the sequence program changes in accordance with the execution conditions of the function block and the rung to be taken. Therefore, as can be seen in an operation cycle from 32 ms in FIG. 10, when the scanning time of the sequence program to be scanned within the executable time is short in a halfway manner, the scanning of the sequence program cannot be performed for the second time in the remaining time. In this case, the remaining "extra time" in the executable time becomes a waste of time in the operation of the programmable controller.

In the programmable controller, when a plurality of sequence programs of a plurality of units are parallelly executed, the executable time is divided and allocated as the scanning time of the sequence programs of the units. At this time, when the plurality of sequence programs are parallelly scanned by allocating the executable time at a predetermined ratio, extra time is frequently generated when the scanning time of each sequence program fluctuates due to the situation of the peripheral equipment and the processing conditions as described above. As a result, the operation of the programmable controller may be inefficient.

SUMMARY OF THE INVENTION

Thus, a structure that can efficiently use extra time while ensuring the allocation of executable time to a plurality of sequence programs is desired.

In the present invention, the abovementioned problem is solved by accumulating, in a programmable controller that allocates executable time in each operation cycle to a plurality of sequence programs at a predetermined time ratio as allocation time and executes the sequence programs in a sequentially repeating manner, extra time when the extra time occurs in the execution of the sequence programs within the allocation time and executing the sequence program of a predetermined path in surplus time obtained by accumulating the accumulated extra time.

A programmable controller according to the present invention is a programmable controller that allocates, to a plurality of paths, allocation times obtained by dividing executable time in one operation cycle at a predetermined ratio, and executes sequence programs of the paths in the respective allocation times, the programmable controller including: an extra time accumulation unit that accumulates extra time; a sequence execution unit that executes the sequence programs within the respective allocation times and accumulates remaining time in the extra time accumulation unit as extra time when execution of each of the sequence programs ends before an end of a corresponding allocation time of the allocation times; a surplus time determination unit that determines whether or not surplus time occurs on basis of the extra time accumulated in the extra time accumulation unit; and a divided sequence determination unit that determines whether each of the sequence programs is executed after being divided by the sequence execution unit when the surplus time determination unit determines that the surplus time occurs, and instructs the sequence execution unit to execute a remainder of a divided sequence program in the surplus time in accordance with a result of the determination.

The programmable controller may further include an allocation table in which a ratio at which the executable time is allocated to the plurality of paths is defined. In this case, a ratio at which the surplus time is distributed to the plurality of paths can be settable in the allocation table, and the divided sequence determination unit can instruct the sequence execution unit to execute the divided sequence program by distributing the surplus time in accordance with the ratio which is set in the allocation table and at which the surplus time is distributed to the plurality of paths, when the sequence programs in two or more paths are executed after being divided.

The present invention includes the abovementioned configuration, and hence efficient sequence control becomes possible by allocating the surplus time that has been wasted to the execution of the sequence program. The actual execution time can be efficiently used while maintaining the independence of the programmable controller that executes the plurality of sequence programs in a sequentially repeating manner at a predetermined time ratio within one execution cycle.

DETAILED DESCRIPTION OF THE PREFERRED EMBODIMENTS

Figure 1:
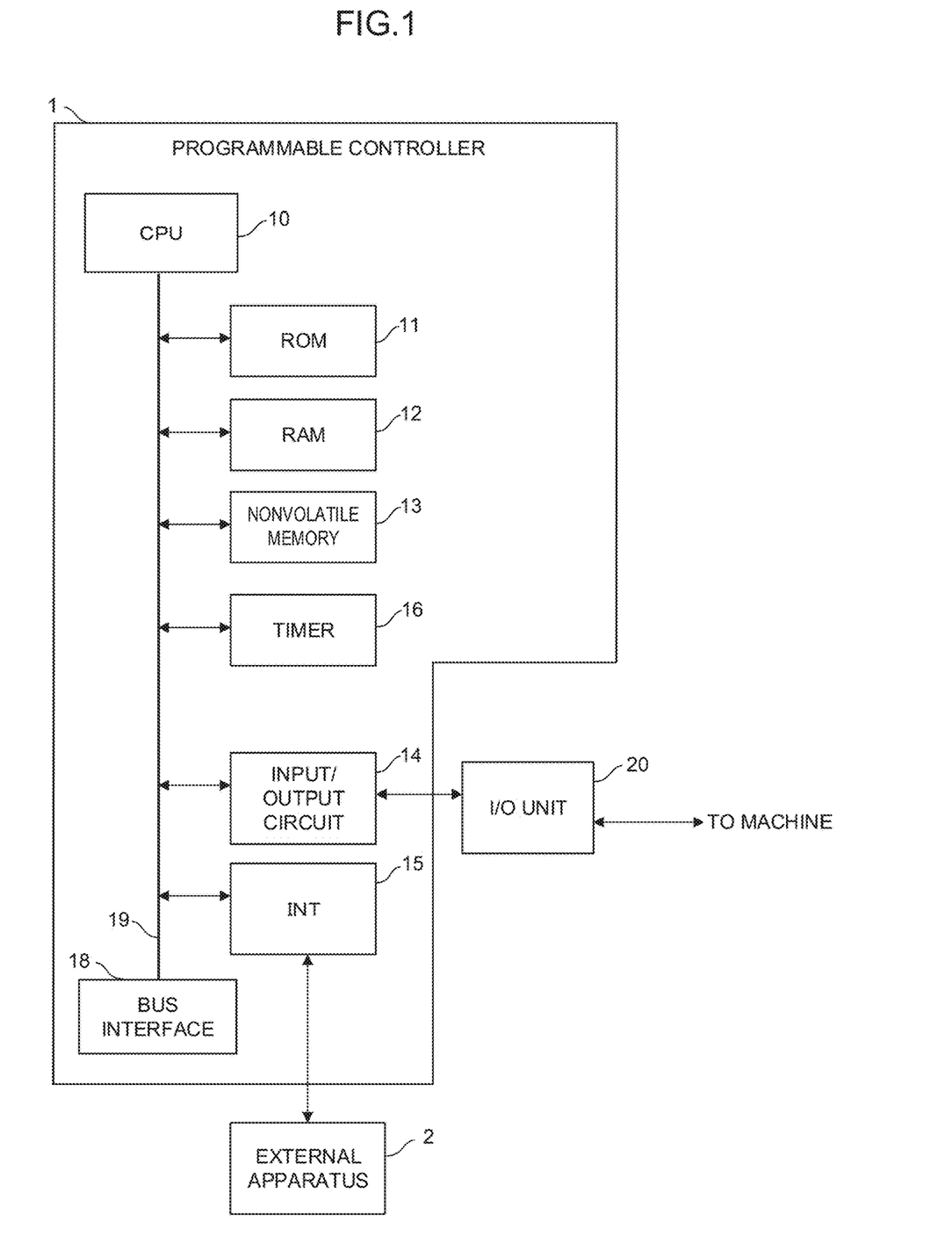
FIG. 1 is a schematic hardware configuration diagram of a programmable controller according to one embodiment.

FIG. 1 is a schematic hardware configuration diagram of a programmable controller according to one embodiment of the present invention.

A programmable controller 1 includes a CPU 10 that executes sequence control. A ROM 11, a RAM 12, a nonvolatile memory 13, an input/output circuit 14, and an interface 15 are connected to the CPU 10 via a bus 19. An external apparatus 2 for performing reading and writing of a CompactFlash memory (CF memory) is connected to the interface 15. The CPU 10 can acquire a sequence program of an execution format object from the external apparatus 2 to which the CF memory and the like are attached via the interface 15 and can record the sequence program in the nonvolatile memory 13. The bus 19 is connectable to a control apparatus such as a computer numerical control via a bus interface 18. Various actuators, sensors, and the like of machines to be controlled such as peripheral apparatuses and machining tools are connected to the input/output circuit 14 via an I/O unit 20.

A system program to be executed by the CPU 10 of the programmable controller 1 is stored in the ROM 11. The CPU 10 controls the operation of each unit of the programmable controller 1 by executing the system program. In the nonvolatile memory 13, sequence programs to be executed by the programmable controller 1 are stored. At the time of the execution of the sequence programs, the CPU 10 reads out the sequence programs from the nonvolatile memory 13, stores the readout sequence programs in a storage region for the sequence programs for execution of the RAM 12, and sequentially executes the sequence programs for execution stored in the RAM 12.

In the RAM 12, a memory region for signals for execution that stores various signals therein when the programmable controller 1 executes the sequence programs is provided, and a region that stores therein the state of an internal relay in the sequence programs, output signals, input signals, and the like that are necessary when the sequence programs are executed is provided in the memory region for signals for execution.

A timer 16 is formed by a real time clock (RTC), for example, and is used for counting the processing time and the like.

Figure 2:
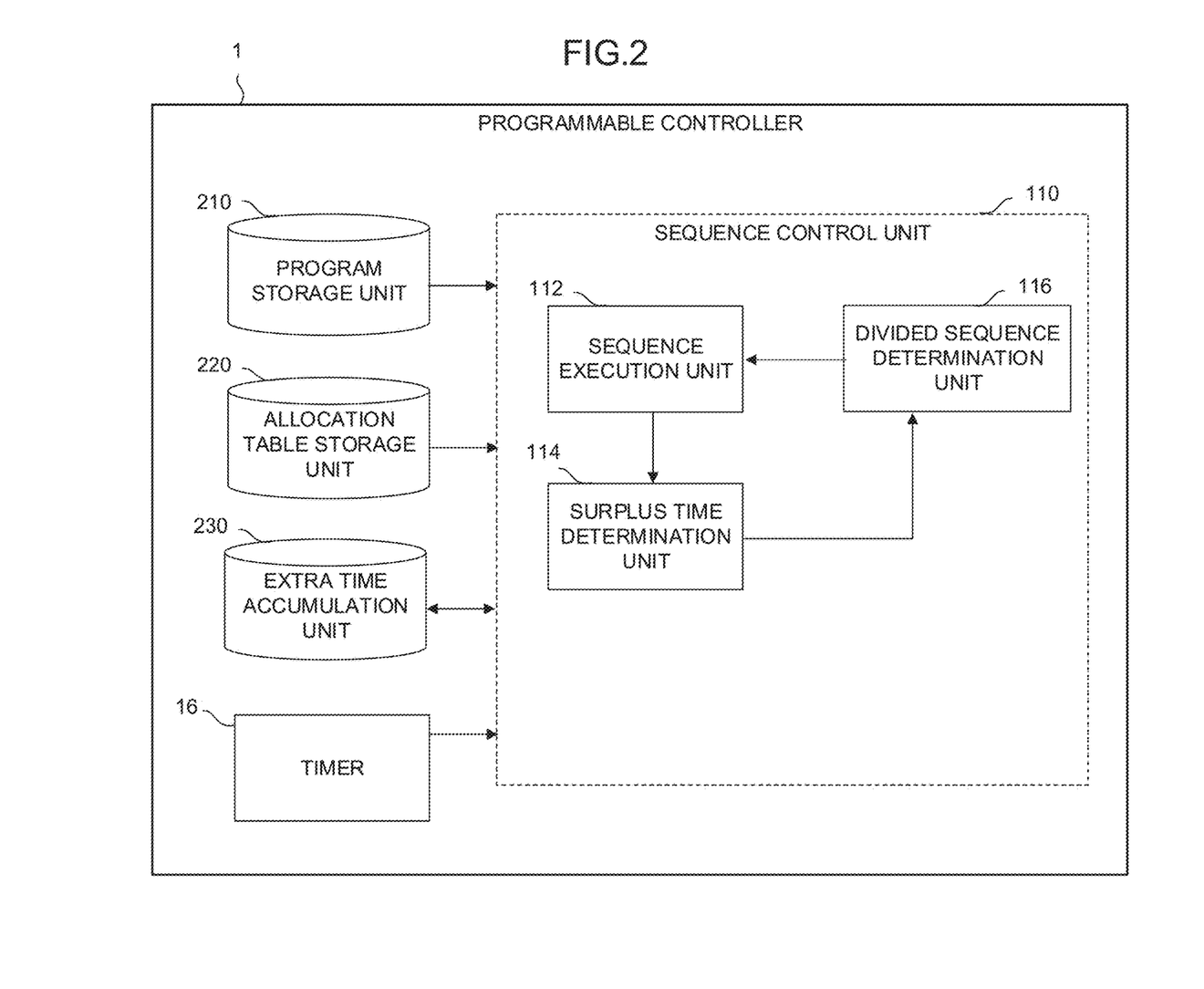
FIG. 2 is a block diagram illustrating schematic functions of the programmable controller according to one embodiment.

FIG. 2 illustrates the functions included in the programmable controller 1 according to one embodiment of the present invention as a schematic block diagram.

The functions included in the programmable controller 1 according to this embodiment are implemented by controlling the operation of the respective units of the programmable controller 1 by executing the system program by the CPU 10 included in the programmable controller 1 illustrated in FIG. 1.

The programmable controller 1 of this embodiment includes a sequence control unit 110. In the RAM 12 or the nonvolatile memory 13 of the programmable controller 1, a program storage unit 210 that is a region that stores therein the sequence programs executed by the programmable controller 1, an allocation table storage unit 220 that stores therein an allocation table in which information on the allocation of the executable time with respect to the sequence programs is set, and an extra time accumulation unit 230 that accumulates extra time are provided.

The functions of the sequence control unit 110 are implemented by mainly performing arithmetic processing using the RAM 12 and the nonvolatile memory 13 by the CPU 10 included in the programmable controller 1 illustrated in FIG. 1, counting processing by the timer 16, and input/output processing via the input/output circuit 14 and the bus interface 18 by executing the system program read out from the ROM 11 by the CPU 10. The sequence control unit 110 allocates the executable time of operation cycles to the sequence programs stored in the program storage unit 210 and executes the sequence programs in accordance with the allocated executable time. The sequence control unit 110 includes a sequence execution unit 112, a surplus time determination unit 114, and a divided sequence determination unit 116.

In the allocation table storage unit 220 referred to by the sequence control unit 110, an allocation table in which the information on the allocation of the executable time with respect to the sequence programs is set is stored. The sequence control unit 110 divides the executable time in accordance with the information on the allocation of the executable time set in the allocation table stored in the allocation table storage unit 220 and allocates the divided executable time as the allocation time necessary for the execution of the sequence programs read out from the program storage unit 210.

The sequence execution unit 112 executes at least one sequence program prestored in the program storage unit 210 within each allocation time allocated by the sequence control unit 110. When the entire execution of the sequence program does not end within the allocation time, the sequence execution unit 112 divides the sequence program within a range in which the execution is possible within the allocation time and executes the divided sequence program. When the execution of the sequence program ends within the allocation time, the sequence execution unit 112 measures the difference between the allocation time allocated to the path and the time actually taken for the execution of the sequence program as the extra time, and accumulates (adds) the measured extra time to the extra time accumulation unit 230. Then, the sequence execution unit 112 proceeds to the execution of the sequence program of the next path without waiting for the allocation time to end.

Figure 3:
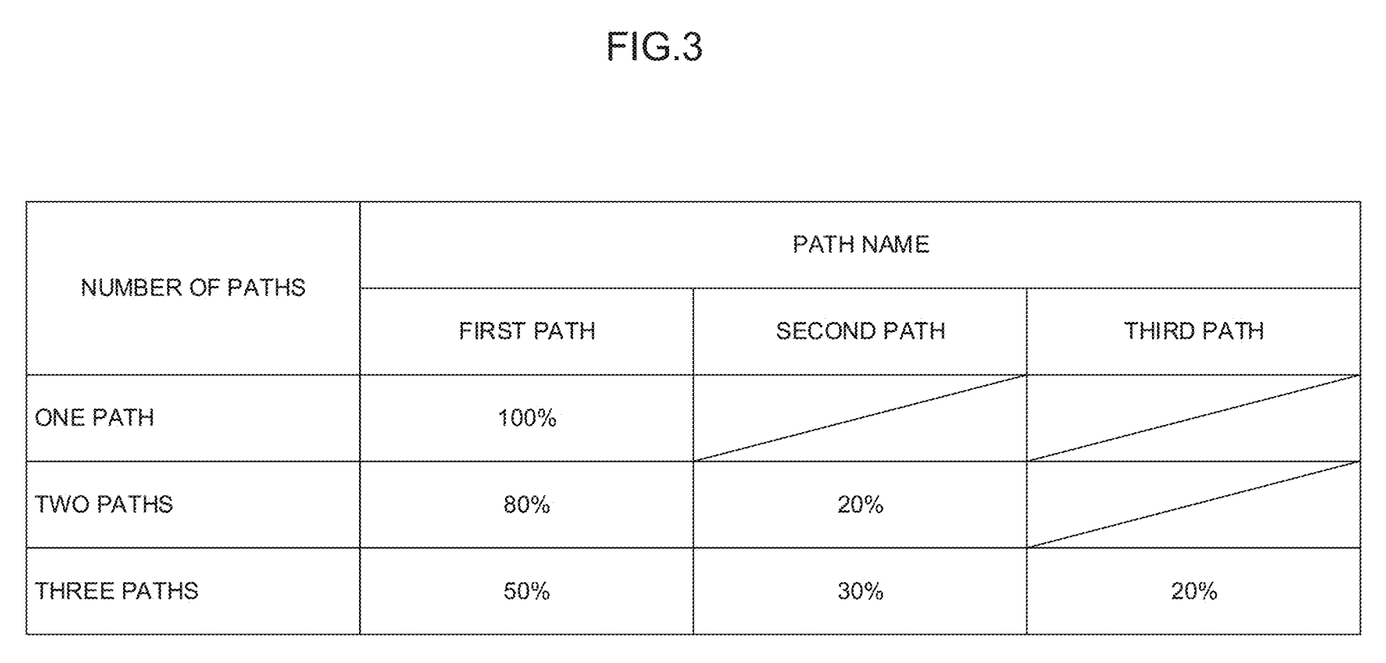
FIG. 3 shows an example of an allocation table.

FIG. 3 shows an example of the allocation table. The allocation table can be defined as a table in which the ratio at which the executable time is allocated to the execution of the sequence program is set for each path, for example. In the allocation table shown in FIG. 3, for example, when sequence control of a machine including three paths, that is, a first path, a second path, and a third path is performed, the table is defined such that 50% of the executable time is allocated to the execution of the sequence program of the first path, 30% of the executable time is allocated to the execution of the sequence program of the second path, and 20% of the executable time is allocated to the execution of the sequence program of the third path as the allocation time.

Figure 4:
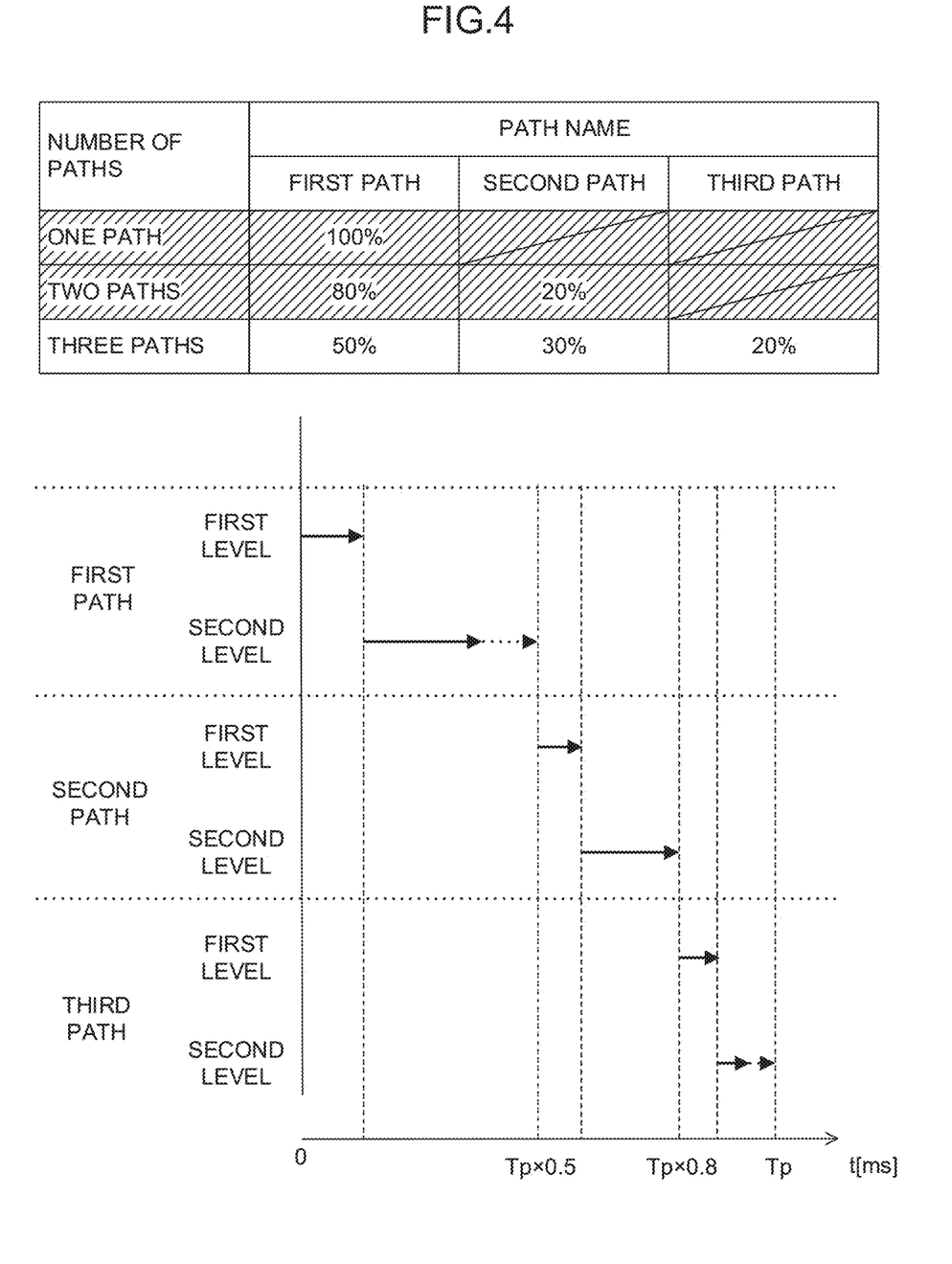
FIG. 4 shows an example in which sequence programs of a plurality of paths are operated in accordance with the allocation table by a related-art technology.

FIG. 4 shows an example in which a programmable controller according to a related-art technology performs sequence control of a machine including three paths, that is, a first path, a second path, and a third path in accordance with the allocation table illustrated in FIG. 3.

In the program storage unit 210, a sequence program for a first level and a sequence program for a second level of the first path, a sequence program for a first level and a sequence program for a second level of the second path, and a sequence program for a first level and a sequence program for a second level of the third path are stored. At this time, the programmable controller:

(i) allocates $T_p \times 0.5$ that is 50% of an executable time $T_p$ to the execution of the sequence program for the first level and the sequence program for the second level of the first path as the allocation time;

(ii) allocates $T_p \times 0.3$ that is 30% of the executable time $T_p$ to the execution of the sequence program for the first level and the sequence program for the second level of the second path as the allocation time; and (iii) allocates $T_p \times 0.2$ that is the remaining 20% of the executable time $T_p$ to the execution of the sequence program for the first level and the sequence program for the second level of the third path as the allocation time.

The sequence programs are executed in accordance with the allocated allocation time. In the example in FIG. 4, extra time occurs in the allocation time allocated to the first path and the allocation time allocated to the third path, and the execution of the sequence program for the second level does not end within the allocation time in the second path. At this time, the programmable controller divides the sequence program for the second level within a range in which the execution ends within the allocation time, and the first half part obtained by the division is executed in the current operation cycle. Then, the remaining part obtained by the division is executed in the next operation cycle.

Figure 5:
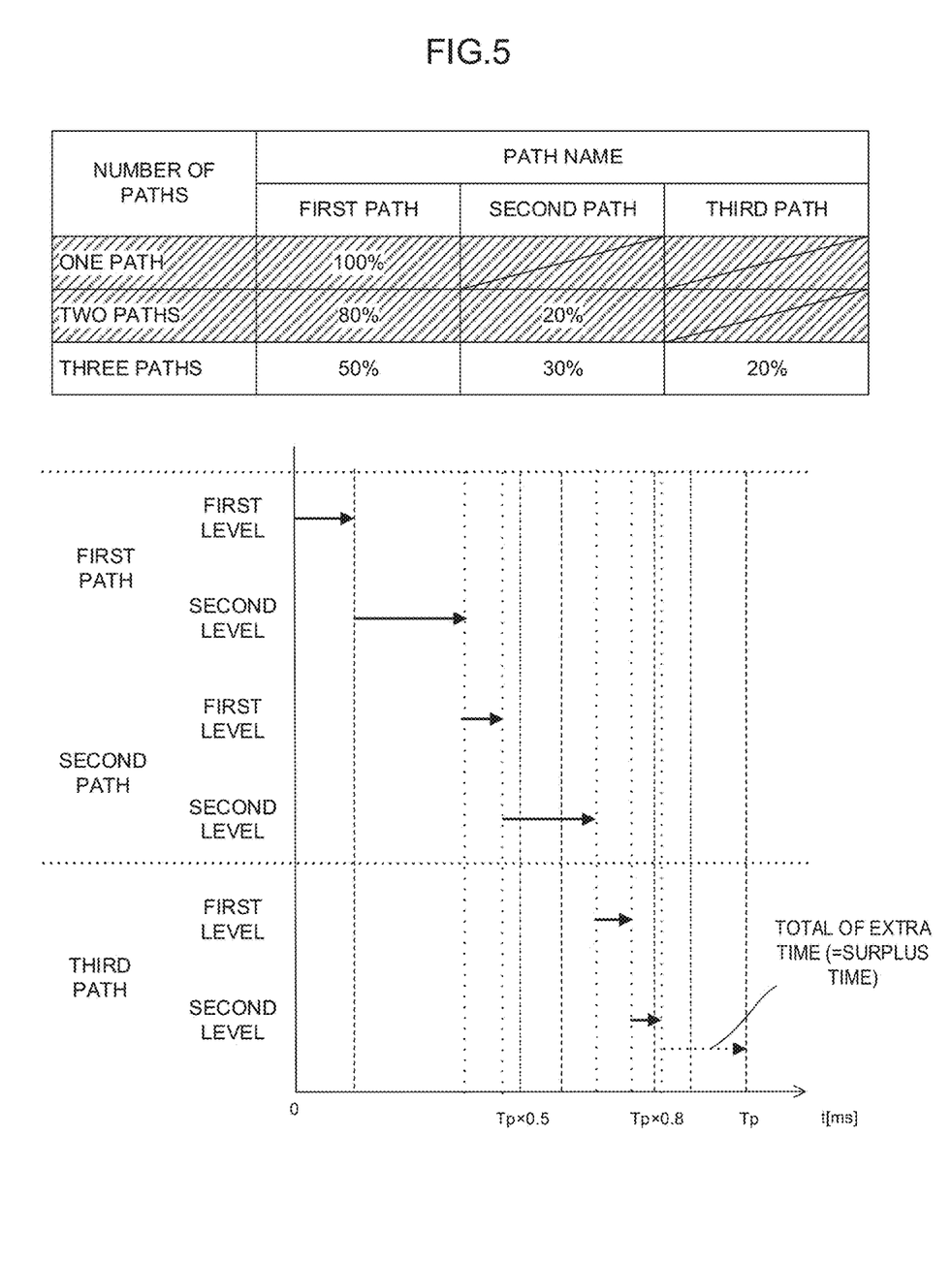
FIG. 5 shows an example in which the sequence programs of the plurality of paths are operated in accordance with the allocation table by an approach of the present invention.

FIG. 5 shows an example in which the sequence execution unit 112 performs the execution of the sequence programs in order to perform the sequence control of the machine including three paths, that is, the first path, the second path, and the third path in accordance with the allocation table illustrated in FIG. 3 in the programmable controller 1 according to this embodiment.

In the program storage unit 210, the sequence program for the first level and the sequence program for the second level of the first path, the sequence program for the first level and the sequence program for the second level of the second path, the sequence program for the first level and the sequence program for the second level of the third path are stored. At this time, when the execution of the sequence program for the first level and the sequence program for the second level in each path end, the sequence execution unit 112 proceeds to the execution of the sequence program of the next path without waiting for the allocation time to end. Therefore, when the execution of the sequence program in each path ends earlier than the allocation time, surplus time that is the total of the time that has been considered to be extra time in the related-art technology remains at the end of the executable time. As with the case of FIG. 4, in the example in FIG. 5, the sequence program for the second level is executed after being divided in the second path.

When the sequence execution unit 112 finishes the execution of the sequence programs of each path, the surplus time determination unit 114 determines whether or not the surplus time that is the total of the extra time occurs with reference to the extra time accumulation unit 230. When the surplus time determination unit 114 determines that surplus time occurs, the surplus time determination unit 114 notifies the divided sequence determination unit 116 of the surplus time. At this time, a predetermined threshold value may be preset, and it may be determined that surplus time occurs when the total extra time accumulated in the extra time accumulation unit 230 is equal to or more than the set threshold value. By doing so, the divided sequence determination unit 116 can be prevented from performing wasteful processing when extra time in which the sequence program can be executed is not accumulated.

The divided sequence determination unit 116 determines whether or not the sequence execution unit 112 has executed the sequence program by dividing the sequence program. When the sequence execution unit 112 has executed the sequence program by dividing the sequence program and the surplus time determination unit 114 determines that surplus time occurs, the divided sequence determination unit 116 instructs the sequence execution unit 112 to execute the divided sequence program in the surplus time. When the execution of the sequence program in the surplus time by the sequence execution unit 112 ends, the sequence control unit 110 initializes the extra time accumulation unit 230 to 0.

Figure 6:
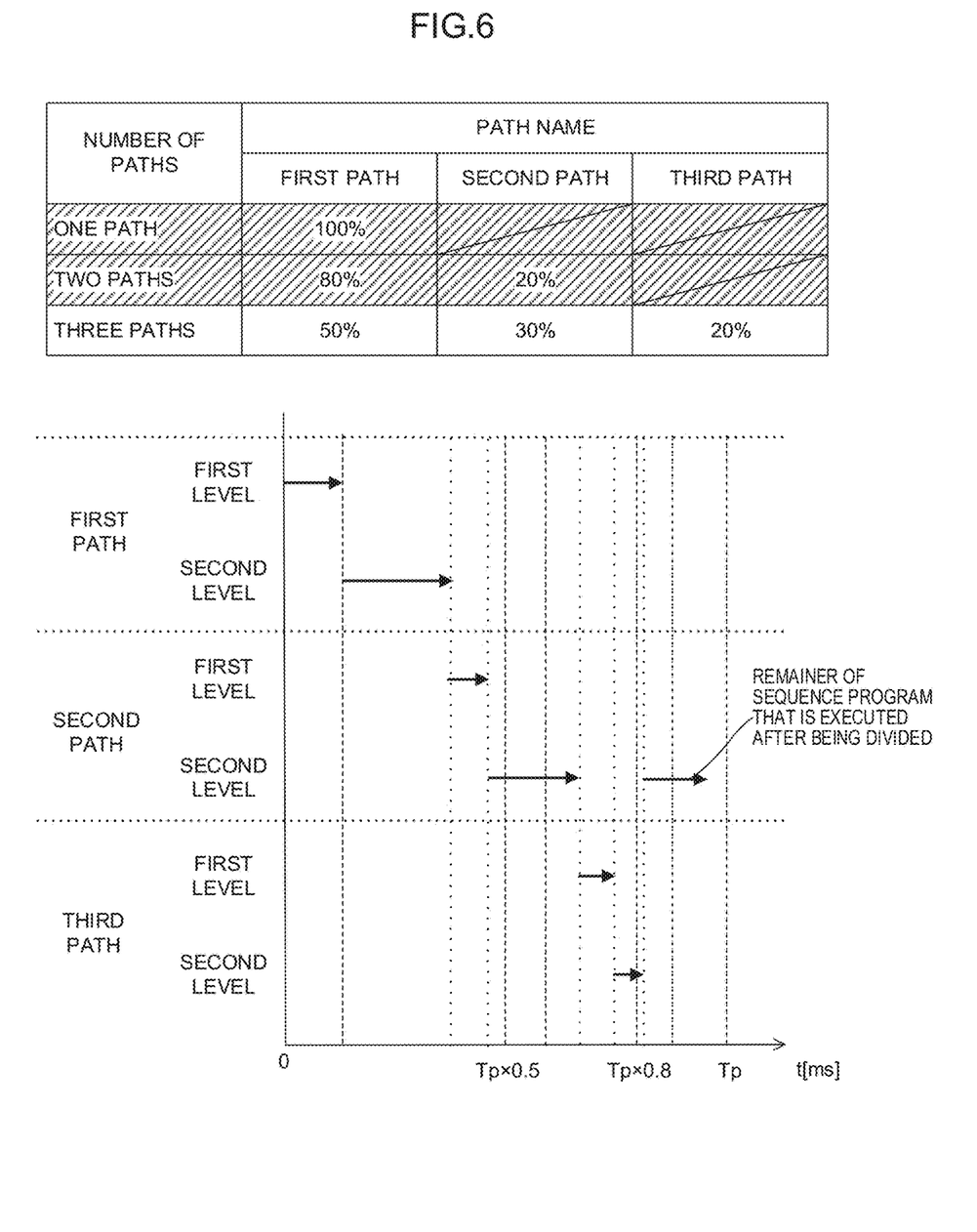
FIG. 6 shows an example in which divided sequence programs are operated in surplus time.

FIG. 6 shows an example in which the sequence execution unit 112 executes the remainder of the sequence program executed after being divided in the second path in the surplus time in the example in FIG. 5.

As described above, when extra time occurs in the execution of the sequence programs of each path in each operation cycle, the programmable controller 1 according to this embodiment collects the extra time to a place after the operation cycles as surplus time, and executes the sequence program of which execution is not finished within the allocation time in the surplus time. In the related-art technology, the extra time becomes a waste of time, and the sequence program of which execution is not finished within the allocation time is executed in the next operation cycle. In the programmable controller 1 according to this embodiment, the divided sequence programs can be executed more efficiently by effectively using the surplus time obtained by accumulating the extra times.

As described above, the programmable controller 1 according to this embodiment including the abovementioned configuration can perform efficient sequence control by allocating the surplus time that has been wasted to the execution of the sequence programs. The actual execution time can be efficiently used while maintaining the independence of the programmable controller that executes a plurality of sequence programs in a sequentially repeating manner at a predetermined time ratio within one operation cycle.

Figure 7:
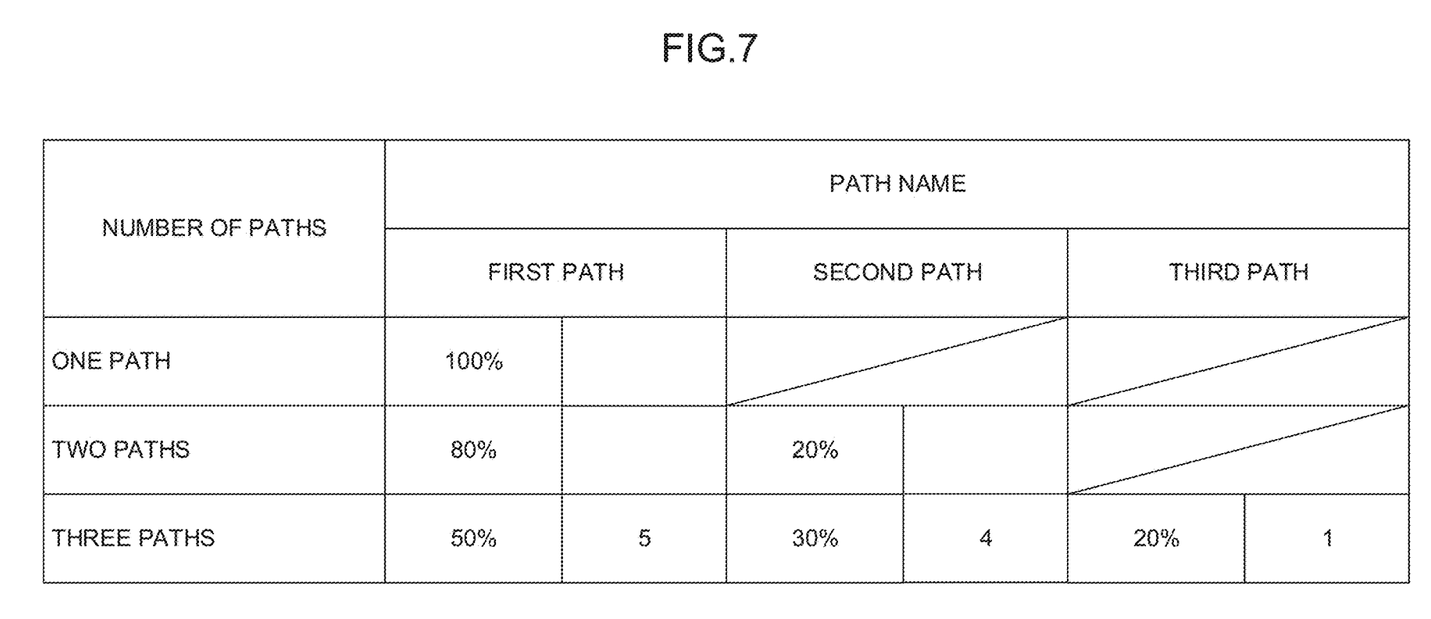
FIG. 7 shows an example in which a ratio of distribution of the surplus time is set in the allocation table.

As one modified example of the programmable controller 1 according to this embodiment, the ratio at which the surplus time is distributed to the paths may be able to be set in the allocation table. FIG. 7 shows an example of an allocation table in which the ratio at which the surplus time is distributed to the paths is set. In the example in FIG. 7, when the sequence control of the three paths is performed, 50% of the executable time is allocated to the execution of the sequence program of the first path, 30% of the executable time is allocated to the execution of the sequence program of the second path, and 20% of the executable time is allocated to the execution of the sequence program of the third path, and the surplus time is set to be allocated to the first path, the second path, and the third path at a ratio of 5:4:1. At this time, when surplus time occurs when the sequence program is executed and the sequence programs are executed after being divided in the second path and the third path, the divided sequence determination unit 116 instructs the sequence execution unit 112 to execute the sequence programs by allocating the surplus time to the second path and the third path at a ratio of 4:1 (because the surplus time does not need to be allocated to the first path). By enabling a ratio at which the surplus time is distributed as above to be set, flexible operation in which the surplus time is allocated by a larger amount to a path to be prioritized, for example, becomes possible when the sequence programs are executed after being divided in the plurality of paths.

Figure 8:
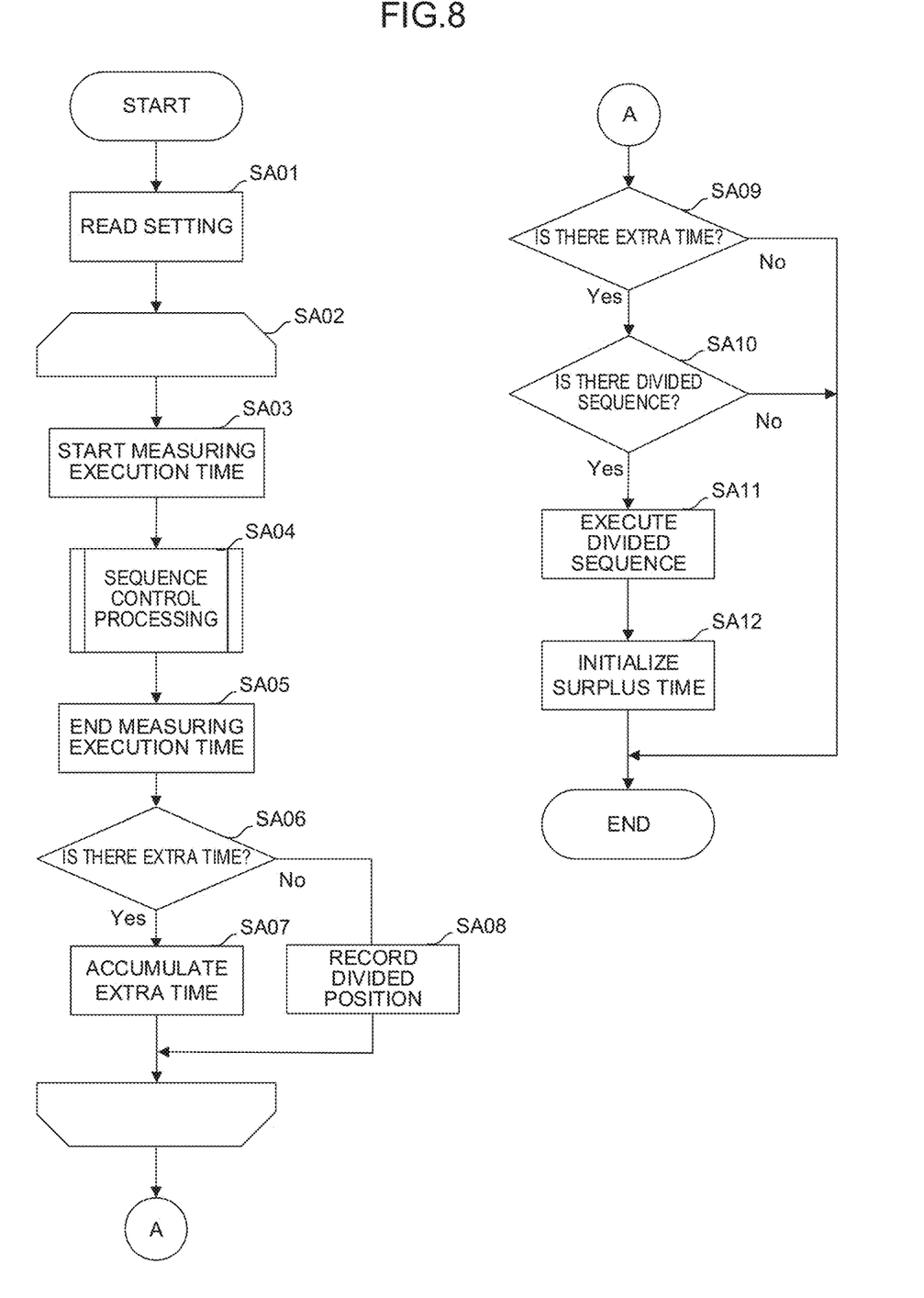
FIG. 8 is a flowchart illustrating a schematic operation of the programmable controller according to one embodiment.

FIG. 8 illustrates a schematic flowchart of the operation in one operation cycle of the programmable controller 1 described above.

The sequence control unit 110 included in the programmable controller 1 reads the settings of the allocation table stored in the allocation table storage unit 220 in each operation cycle (Step SA01) and allocates executable time to each path. Then, the sequence control unit 110 repeatedly executes Step SA03 to Step SA08 for each path (Step SA02). In each path, the sequence execution unit 112 performs sequence control processing by executing a sequence program (Step SA04) while measuring the processing time by the timer 16 (Step SA03, Step SA05). At this time, when the execution time of the sequence program is shorter than the allocation time, it is determined that extra time occurs (Step SA06), the extra time is accumulated in the extra time accumulation unit 230 (Step SA07), and the operation proceeds to the operation of the next path. When the sequence program is divided without the generation of the extra time, the divided position is recorded (Step SA08).

When the execution of the sequence program in all the paths is completed, the surplus time determination unit 114 determines whether surplus time occurs (Step SA09). When surplus time occurs, the divided sequence determination unit 116 further determines whether or not there is a sequence program that is executed after being divided (Step SA10). When surplus time occurs and there is a sequence program that is executed after being divided, the remainder of the sequence executed after being divided is executed in the surplus time (Step SA11). Lastly, the surplus time is initialized (Step SA12), and the processing ends in the current operation cycle.

One embodiment of the present invention has been described above, but the present invention is not limited to the example of the embodiment described above and can be carried out in various modes by making modifications, as appropriate.

The invention claimed is:

1. A programmable controller that allocates, to a plurality of paths, allocation times obtained by dividing executable time in one operation cycle at a predetermined ratio, and executes sequence programs of the paths in the respective allocation times, the programmable controller comprising:
   an extra time accumulation unit that accumulates extra time;
   a sequence execution unit that executes the sequence programs within the respective allocation times and accumulates remaining time in the extra time accumulation unit as extra time when execution of each of the sequence programs ends before an end of a corresponding allocation time of the allocation times;
   a surplus time determination unit that determines whether or not surplus time occurs on basis of the extra time accumulated in the extra time accumulation unit; and
   a divided sequence determination unit that determines whether each of the sequence programs is executed after being divided by the sequence execution unit when the surplus time determination unit determines that the surplus time occurs, and instructs the sequence execution unit to execute a remainder of a divided sequence program in the surplus time in accordance with a result of the determination.

2. The programmable controller according to claim 1, further comprising an allocation table in which a ratio at which the executable time is allocated to the plurality of paths is defined, wherein
   a ratio at which the surplus time is distributed to the plurality of paths is settable in the allocation table; and
   the divided sequence determination unit instructs the sequence execution unit to execute the divided sequence program by distributing the surplus time in accordance with the ratio which is set in the allocation table and at which the surplus time is distributed to the plurality of paths, when the sequence programs in two or more paths are executed after being divided.

* * * * *